United States Patent
Tanaka et al.

(10) Patent No.: US 6,850,299 B2
(45) Date of Patent: Feb. 1, 2005

(54) LIQUID CRYSTAL DISPLAY DEVICE

(75) Inventors: Tsutomu Tanaka, Kanagawa (JP); Masumitsu Ino, Kanagawa (JP); Hidemasa Yamaguchi, Kanagawa (JP); Yoko Fukunaga, Kanagawa (JP); Shinji Nakamura, Kanagawa (JP)

(73) Assignee: Sony Corporation, Tokyo (JP)

( * ) Notice: Subject to any disclaimer, the term of this patent is extended or adjusted under 35 U.S.C. 154(b) by 106 days.

(21) Appl. No.: 10/414,380

(22) Filed: Apr. 15, 2003

(65) Prior Publication Data

US 2004/0001172 A1 Jan. 1, 2004

(30) Foreign Application Priority Data

Apr. 16, 2002 (JP) .................................... 2002-113833

(51) Int. Cl.[7] ............................................. G02F 1/1335
(52) U.S. Cl. ................................................... 349/114
(58) Field of Search ........................................ 349/114

Primary Examiner—Tarifur R. Chowdhury
Assistant Examiner—Richard H Kim
(74) Attorney, Agent, or Firm—Robert J. Depke; Holland & Knight LLP

(57) ABSTRACT

A liquid crystal display device, which has a pair of substrates and a liquid crystal layer held therebetween, includes a transmission display region for performing image display by transmission light and a reflection display region for performing image display by reflection light. The display device is provided with a data line for supplying a signal to a drive element adapted to drive the liquid crystal layer, and is characterized in that a section, adjacent to the transmission display region, of the data line is formed on a plane different from a plane on which a section, adjacent to the reflection display region, of the data line is formed. Such a display device is advantageous in suppressing enlargement of an ineffective region in the vicinity of a section, adjacent to a data line, of a transmission display region, even if the transmission display region is enlarged for enhancing the brightness of transmission display, thereby realizing a desirable display quality.

13 Claims, 7 Drawing Sheets

INEFFECTIVE REGION

LIQUID CRYSTAL DISPLAY DEVICE

This application claims priority to Japanese Patent Application No. JP2002-113833 filed Aug. 16, 2002 which are incorporated herein by reference.

BACKGROUND OF THE INVENTION

The present invention relates to a liquid crystal display device, and particularly to an improvement of a reflection-transmission hybrid type liquid crystal display device.

Taking advantage of thin shape and low power consumption, liquid crystal display devices have been extensively used for laptop personal computers, display units for car navigation, portable information terminals (PDAs: Personal Digital Assistants), and cellular telephones. These liquid crystal display devices are generally classified into a transmission type and a reflection type. In the transmission type, image display is performed by switching the on/off state of light by a liquid crystal panel, wherein the light has been emitted from an internal light source called "backlight" and enters the liquid crystal panel, and a reflection type in which image display is performed by switching the on/off state of external light such as sun light by a liquid crystal panel, wherein the external light has been reflected from a reflection plate or the like and enters the liquid crystal panel.

The transmission type liquid crystal display device, however, has problems that since the power consumption of the backlight is as large as 50% or more of the total power consumption of the display device, the total-power consumption of the display device is increased by using the backlight, and that when the surrounding environment is bright, an image displayed by the light is dark, to degrade the visibility of the image.

The reflection type liquid crystal display device overcomes the problem associated with the increased power consumption because the display device is provided with no backlight; however, such a display device has a problem that when the surrounding environment is dark, the amount of reflected light is reduced, to significantly degrade the visibility of an image displayed by the reflected light.

To solve the problems of both the transmission type liquid crystal display device and the reflection type liquid crystal display device, there has been proposed a reflection-transmission hybrid type liquid crystal display device intended to realize both the transmission display mode and the reflection display mode by one liquid crystal panel. In this reflection-transmission hybrid type liquid crystal display device, when the surrounding environment is bright, display (reflection display) is performed by using external light reflected from a reflection plate or the like, and when the surrounding environment is dark, display (transmission display) is performed by using light emitted from a backlight. Such a reflection-transmission hybrid type liquid crystal display device has been disclosed, for example, in Japanese Patent No. 2955277 and Japanese Patent Laid-open No. 2001-166289.

FIG. 6 is a plan view showing a planar structure of a thin film transistor (hereinafter, referred to as "TFT") substrate 102 of a related art reflection-transmission hybrid type liquid crystal display device 101. Referring to this figure, a plurality of pixel electrodes 103 controlled by TFTs (to be described later) are arranged in a matrix on the TFT substrate 102, and gate lines 104 for supplying scanning signals to the TFTs and data lines 105 for supplying display signals to the TFTs are provided in perpendicular to each other on the TFT substrate 102 in such a manner as to surround the pixel electrodes 103, to form pixel regions.

Auxiliary capacitance lines (hereinafter, referred to as "Cs lines") 106 made from a metal film are provided on the TFT substrate 102 in such a manner as to be in parallel to the gate lines 104. As will be described later, the Cs line 106 forms an auxiliary capacitance C between a connection electrode and the same, and is connected to a counter electrode provided on a color filter substrate.

A reflection display region A for reflection display and a transmission display region B for transmission display are provided in each of the pixel electrodes 103.

FIG. 7 shows a cross-sectional structure of the liquid crystal display device 101 along line F—F' of FIG. 6. The liquid crystal display device has a structure that the above-described TFT substrate 102 and a color filter substrate 107 are disposed in such a manner as to face to each other with a liquid crystal layer 108 held therebetween.

The color filter substrate 107 has a structure that a color filter 110 and a counter electrode 111 made from ITO (Indium Tin Oxide) or the like are arranged in this order on a surface, facing to the TFT substrate 102, of a transparent insulating substrate 109 made from glass or the like. The color filter 110 is a resin layer portion colored into respective colors by pigments or dyes, and is typically composed of a combination of filter layers of colors of R (red), G (green), and B (blue).

A quarter wavelength ($\lambda/4$) layer 112 and a polarizing plate 113 are arranged on a surface, opposed to the surface provided with the color filter 110 and the counter electrode 111, of the color filter substrate 107.

In the reflection display region A of the TFT substrate 102, there are formed TFTs 115, a scattering layer 116, a planarizing layer 117, and a reflection electrode 119 on a transparent insulating substrate 114 made from a transparent material such as glass. The TFTs 115 function as switching elements for supplying display signals to the pixel electrodes 103. The scattering layer 116 is formed on the TFTs 115 via a multi-layer insulating film (to be described in detail later). The planarizing layer 117 is formed on the scattering layer 116. The reflection electrode 119 is formed on the planarizing layer 117 via an ITO film 118a.

The TFT 115 shown in FIG. 7 is of a so-called bottom gate structure including a gate electrode 120, a gate insulating film 121, and a semiconductor thin film 122. The gate electrode 120 is formed on the transparent insulating substrate 114. The gate insulating film 121 is composed of a multi-layer film having a silicon nitride film 121a and a silicon oxide film 121b stacked on the upper surface of the gate electrode 120. The semiconductor thin film 122 is formed on the gate insulating film 121, wherein regions, on both sides of the gate electrode 120, of the semiconductor thin film 122 are taken as $N^+$ diffusion regions. The gate electrode 120 is formed by extending part of the gate line 104, and is made from a metal such as molybdenum (Mo) or tantalum (Ta) or an alloy thereof by sputtering or the like.

A contact hole is formed in both a first interlayer insulating film 123 and a second interlayer insulating film 124 at a position corresponding to that of one of the $N^+$ diffusion regions of the semiconductor thin film 122. A source electrode 125 is-connected to the one of the $N^+$ diffusion regions of the semiconductor thin film 122 via the contact hole. The data line 105 is connected to the source electrode 125. A data signal is inputted to the source electrode 125 via the data line 105. Another contact hole is formed in both the first interlayer insulating film 123 and the second interlayer insulating film 124 at a position corresponding to that of the other of the $N^+$ diffusion regions of the semiconductor thin film 122.

A drain electrode 126 is connected to the other of the N+ diffusion regions of the semiconductor thin film 122 via the contact hole. The drain electrode 126 is connected to a connection electrode 127, and is electrically connected to the pixel electrode 103 via a contact portion 128. The connection electrode 127 forms the auxiliary capacitance C between the Cs line 106 and the same via the gate insulating film 121. The semiconductor thin film 122 is made from low temperature polysilicon, for example, by a CVD (Chemical Vapor Deposition) process. The semiconductor thin film 122 is formed at a position aligned with that of the gate electrode 120 via the gate insulating film 121.

A stopper 129 is provided directly over the semiconductor thin film 122 via the first interlayer insulating film 123 and the second interlayer insulating film 124. The stopper 129 is adapted to protect the semiconductor thin film 122 formed at the position aligned with that of the gate electrode,120.

In the transmission display region B of the TFT substrate 102, various insulating films formed substantially over the entire surface of the reflection display region A, that is, the gate insulating film 121, the first interlayer insulating film 123, the second interlayer insulating film 124, the scattering layer 116, and the planarizing layer 117 are removed, and a transparent electrode 118 is directly formed on the transparent insulating substrate 114. The reflection electrode 119 formed in the reflection display region A is not formed in the transmission display region B, either.

Like the color filter substrate 107, a λ/4 layer 130 and a polarizing plate 131 are disposed in this order on a surface, on the side opposed to that provided with the TFTs 115 and the like, of the TFT substrate 102, that is, on the side provided with a backlight as an internal light source (not shown), of the TFT substrate 102.

In the related art reflection-transmission hybrid type liquid crystal display device 101 having the above-described configuration, high quality image display can be realized in either the reflection display mode or the transmission display mode because the thickness of the liquid crystal layer 108 in the reflection display region A is different from that of the liquid crystal layer 108 in the transmission display region B.

A difference-in-height between the reflection display region A and the transmission display region B in each pixel region on the TFT substrate 102 is typically set to about 2 μm. As shown in FIG. 7, such a difference-in-height portion has a sharp gradient, to cause problems that liquid crystal domains are liable to occur at a boundary region (equivalent to the difference-in-height portion) between the reflection display region A and the transmission display region B, and that since a gap (thickness of the liquid crystal layer) at the difference-in-height portion satisfies neither a gap required for reflection display nor a gap required for transmission display, the difference-in-height portion contributes neither reflection display nor transmission display, whereby leakage of light may occur at the difference-in-height portion. The region contributing to neither reflection display nor transmission display is hereinafter referred to as "ineffective region". The ineffective region degrading the display quality is generally required to be shielded by a shield film or the like.

By the way, in recent years, to realize more highly precise image display, there has been proposed a liquid crystal display device having a structure that the transmission display region B contributing to transmission display is broadened as shown in FIG. 8.

As a result of broadening the transmission display region B, in each pixel region surrounded by the data lines 105 and the gate lines 104, sections, positioned on both sides of the transmission region A in the direction parallel to the gate line, of the reflection display region A are relatively narrowed. As a result, the transmission display region B becomes close to the data line 105, as shown in FIG. 8, in the direction parallel to the gate line 104 (horizontal direction in the figure).

In the case where the transmission display region B is separated apart from the data line 105 as shown in FIG. 6, the difference-in-height between the reflection display region A and the transmission display region B in each of the direction parallel to the data line (vertical direction in FIG. 6) and the direction parallel to the gate line (horizontal direction in FIG. 6) is, as shown in FIG. 7, equivalent to the total of the thicknesses of the gate insulating film 121, the first interlayer insulting film 123, the second interlayer insulating film 124, the scattering layer 116, the planarizing layer 117, and the reflection electrode 119. On the other hand, in the case where the transmission display region B becomes close to the data line 105 as shown in FIG. 8, the difference-in-height between the reflection display region A and the transmission display region B in the direction parallel to the data line (vertical direction) is the same as that described above; however, the difference-in-height between the reflection display region A and the transmission display region B in the direction parallel to the gate line (horizontal direction) substantially becomes the difference-in-height between the data line region and the transmission display region B because the section, between the transmission display region B and the data line 105, of the reflection display region A is very narrow. By the way, the thickness of the data line region is a value obtained by adding the thickness of the data line 105 to the above-described total thickness. Accordingly, the difference-in-height between the data line region and the transmission display region B in the direction parallel to the gate line (horizontal direction) becomes large, with a result that it fails to obtain a gap (thickness of the liquid crystal layer) required for transmission display at such a difference-in-height.

As a result, the ineffective region becomes large in the section, adjacent to the data line 105, of the transmission display region B, and thereby an effective region becomes relatively small, to cause a problem that desired brightness cannot be obtained in the transmission mode, although the transmission display region B is broadened.

SUMMARY OF THE INVENTION

An object of the present invention is to provide a reflection-transmission hybrid type liquid crystal display device capable of suppressing enlargement of an ineffective region in the vicinity of a section, adjacent to a data line, of a transmission display region, even if the transmission display region is enlarged for enhancing brightness of transmission display, thereby realizing desirable display quality.

To achieve the above object, according to the present invention, there is provided a liquid crystal display device including a pair of substrates and a liquid crystal layer held therebetween. The display device includes a transmission display region for performing image display by transmission light and a reflection display region for performing image display by reflection light. In this display device, a data line for supplying a signal to a drive element adapted to drive the liquid crystal layer is provided, and a section, adjacent to the transmission display region, of the data line is formed on a plane different from a plane on which a section, adjacent to the reflection display region, of the data line is formed.

With this configuration, since a section, adjacent to the transmission display region, of the data line is formed on a plane different from a plane on which a section, adjacent to the reflection display region, of the data line is formed, it is possible to reduce a difference-in-height between the transmission display region and the data line region-adjacent thereto as compared with the related art liquid crystal display device in which a section, adjacent to the transmission display region, of the date line and a section, adjacent to the reflection display region, of the data line are formed on the same plane.

As a result, even if the transmission display region is enlarged to the extent that a section, between the data line and the transmission display region, of the reflection display region is eliminated, it is possible to prevent enlargement of the ineffective region in the section, in the vicinity of the data line, of the transmission display region.

BRIEF DESCRIPTION OF THE DRAWINGS

These and other objects, features, and advantages of the present invention will becomes more apparent from the following detailed description, taken in connection with the accompanying drawings, in which.

DETAILED DESCRIPTION OF THE PREFERRED EMBODIMENTS

Hereinafter, a liquid crystal display device of the present invention will be described in detail with reference to the accompanying drawings, in which preferred embodiments are shown.

A liquid crystal display device of the present invention is of a so-called reflection-transmission hybrid type of carrying out a reflection display mode and a transmission display mode on one display panel, and is configured such that a liquid crystal layer is held between a pair of substrates, that is, a TFT substrate provided with TFTs and the like and a color filter substrate provided with a color filter and the like.

Figure 1:
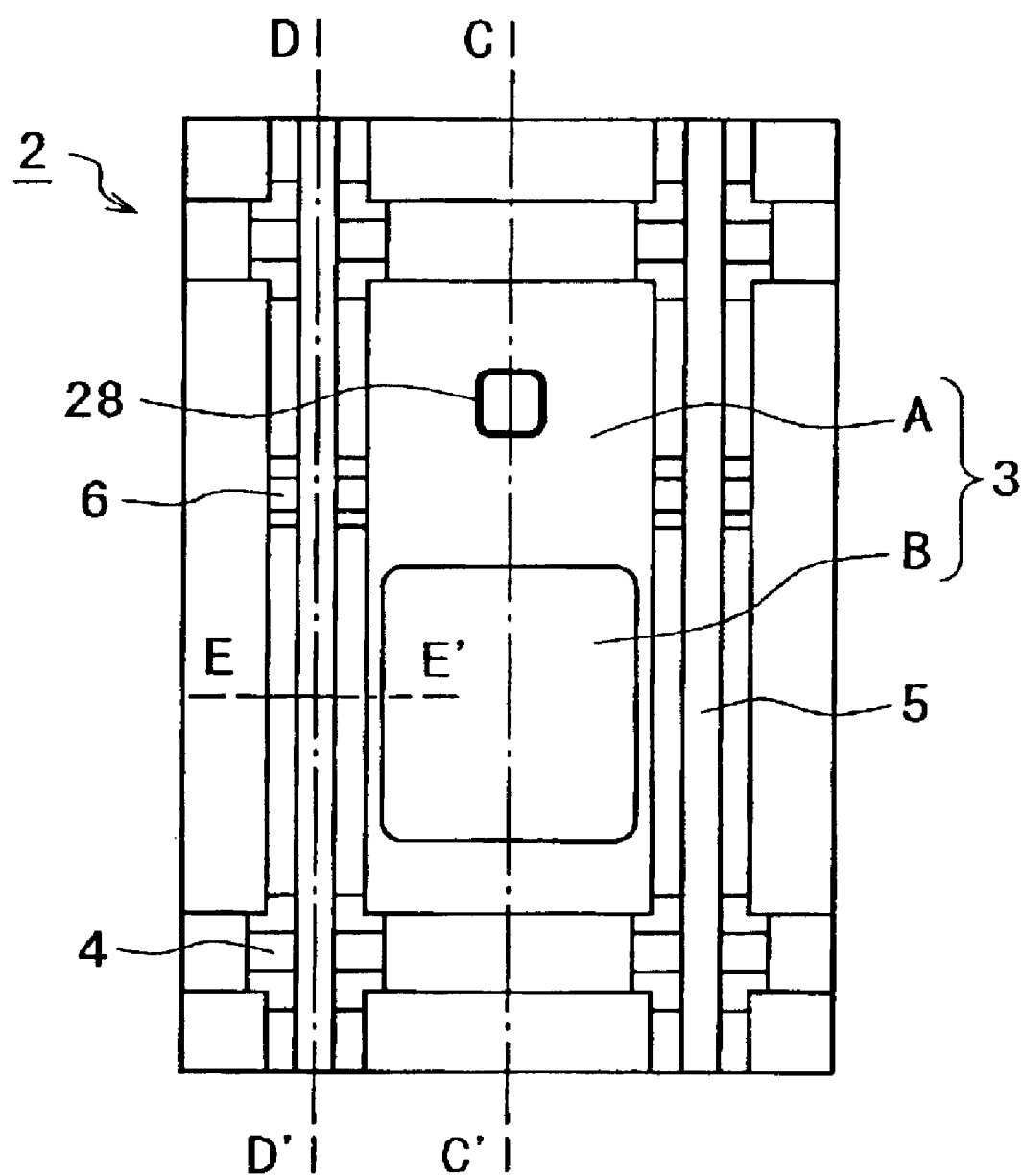
FIG. 1 is a plan view of a TFT substrate of a reflection-transmission hybrid type liquid crystal display device of the present invention.

FIG. 1 is a plan view showing a planar structure of a TFT substrate 2 of a reflection-transmission hybrid type liquid crystal display device 1 of the present invention. Referring to this figure, a plurality of pixel electrodes 3 controlled by TFTs (to be described later) are arranged in a matrix on the TFT substrate 2, and gate lines 4 for supplying scanning signals to the TFTs and data lines 5 for supplying display signals to the TFTs are provided in perpendicular to each other around the pixel electrode 3, to form pixel regions.

Cs lines 6 made from a metal film are also provided on the TFT substrate 2 in such a manner as to be in parallel to the gate lines 4. As will be described later, the Cs line 6 forms an auxiliary capacitance C between a connection electrode and the same, and is connected to a counter electrode provided on a color filter substrate.

A reflection display region A for reflection display and a transmission display region B for transmission display are provided in each of the pixel electrodes 3.

Figure 2:
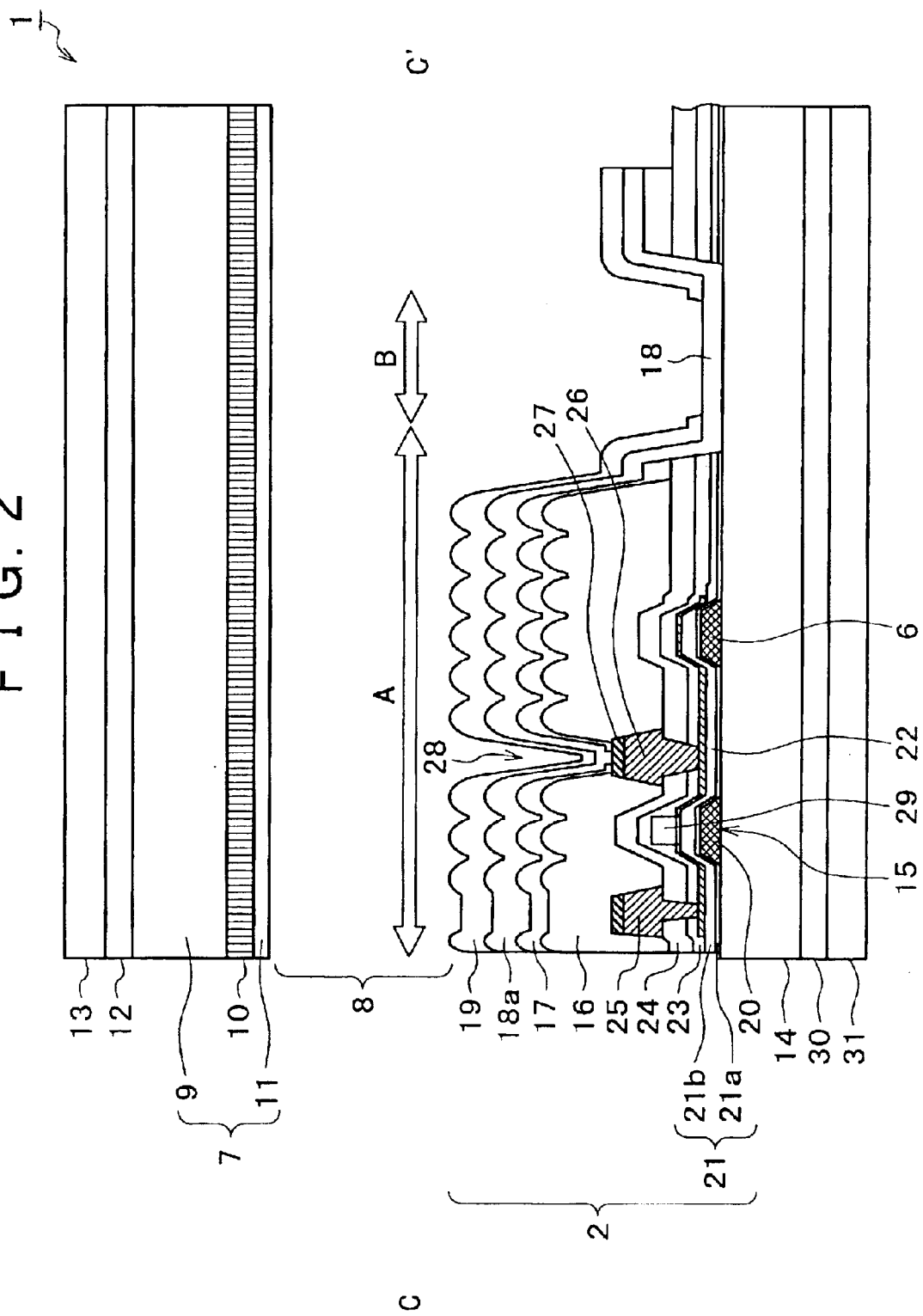
FIG. 2 is a sectional view taken on line C—C' of FIG. 1 showing an essential portion of the liquid crystal display device.

FIG. 2 is a sectional view taken on line C—C' of FIG. 1, which line extends in parallel to the data line 5 while passing through an approximately central portion of the transmission display region B.

A cross-sectional structure of the liquid crystal display device of the present invention, taken on line C—C' of FIG. 1, will be described with reference to FIG. 2.

The liquid crystal display device 1, has a structure that the above-described TFT substrate 2 and a color filter substrate 7 are disposed in such a manner as to face to each other with a liquid crystal 8 held therebetween.

The color filter substrate 7 has a structure that a color filter 10 and a counter electrode 11 made from ITO or the like are arranged in this order on a surface, facing to the TFT substrate 2, of a transparent insulating substrate 9 made from glass or the like. The color filter 10 is a resin layer portion colored into respective colors by pigments or dyes, and is typically composed of a combination of filter layers of colors of R (red), G (green), and B (blue).

A $\lambda/4$ layer 12 and a polarizing plate 13 are arranged on a surface, opposed to the surface provided with the color filter 10 and the counter electrode 11, of the color filter substrate 7.

In the reflection display region A of the TFT substrate 2, there are formed TFTs 15, a scattering layer 16, a planarizing layer 17, and a reflection electrode 19 on a surface, facing to the color filter substrate 2, of a transparent insulating substrate 14 made from a transparent material such as glass. The TFTs function as switching elements for supplying display signals to the pixel electrodes 3. The scattering layer 16 is formed on the TFTs 15 via a multi-layer insulating film (to be described in detail later). The planarizing layer 17 is formed on the scattering layer 16. The reflection electrode 19 is formed on the planarizing layer 17 via an ITO film 18a. The scattering layer 16 and the planarizing layer 17 constitute an irregularity forming layer portion for changing the thickness of the TFT substrate 2 between the reflection display region A and the transmission display region B. The reflection electrode 19 is made from a metal such as rhodium, titanium, chromium, silver, aluminum, or a nickel-chromium alloy. Of these metal materials, silver is preferable because the metal increases the reflectivity in reflection display.

The TFT 15 shown in FIG. 2 is of a so-called bottom gate structure including a gate electrode 20, a gate insulating film 21, and a semiconductor thin film 22. The gate electrode 20 is formed on the transparent insulating substrate 14. The gate insulating film 21 is composed of a multi-layer film having a silicon nitride film 21a and a silicon oxide film 21b stacked on the upper surface of the gate electrode 20. The semiconductor thin film 22 is formed on the gate insulating film 21, wherein regions, on both sides of the gate electrode 20, of the semiconductor thin film 21 are taken as N+ diffusion regions. The gate electrode 20 is formed by extending part of the gate line 4, and is made from a metal such as molybdenum (Mo) or tantalum (Ta) or an alloy thereof by sputtering or the like.

A contact hole is formed in both a first interlayer insulating film 23 and a second interlayer insulating film 24 at a position corresponding to that of one of the N+ diffusion regions of the semiconductor thin film 22. A source electrode 25 is connected to the one of the N+ diffusion regions of the semiconductor thin film 22 via the contact hole. The data line 5 is connected to the source electrode 25. A data signal is inputted to the source electrode 25 via the data line 5. A contact hole is formed in both the first interlayer insulating film 23 and the second interlayer insulating film 24 at a position corresponding to that of the other of the N+ diffusion regions of the semiconductor thin film 22. A drain electrode 26 is connected to the other of the N+ diffusion regions of the semiconductor thin film 22 via the contact hole. The drain electrode 26 is connected to a connection electrode 27, and is electrically connected to the pixel electrode 3 via a contact portion 28. The connection electrode 27 forms the auxiliary capacitance C between the Cs line 6 and the same via the gate insulating film 21. The semiconductor thin film 22 is made from low temperature polysilicon, for example, by a CVD process. The semiconductor thin film 22 is formed at a position aligned with that of the gate electrode 20 via the gate insulating film 21.

A stopper 29 is provided directly over the semiconductor thin film 22 via the first interlayer insulating film 23 and the second interlayer insulating film 24. The stopper 29 is adapted to protect the semiconductor thin film 22 formed at a position aligned with that of the gate electrode 20.

On the other hand, in the transmission display region B of the TFT substrate 2, various insulating films formed substantially over the entire surface of the reflection display region A, that is, the gate insulating film 21, the first interlayer insulating film 23, the second interlayer insulating film 24, the scattering layer 16, and the planarizing layer 17 are removed. A transparent electrode 18 made from ITO or the like is directly formed on the transparent insulating substrate 14. The reflection electrode 19 formed in the reflection display region A is not formed in the transmission display region B, either.

Like the color filter substrate 7, a λ/4 layer 30 and a polarizing plate 31 are disposed in this order on a surface, on the side opposed to that provided with the TFTs 15 and the like, of the TFT substrate 2, that is, on the side provided with a backlight as an internal light source (not shown), of the TFT substrate 2.

The liquid crystal layer 8 held between the TFT substrate 2 and the color filter substrate 7 is a layer of guest-host liquid crystal. The guest-host liquid is mainly composed of nematic liquid crystal molecules having a negative dielectric anisotropy, to which a dichroic pigment is added at a specific ratio. The liquid crystal layer 8 is vertical-aligned by an alignment film (not shown). In this liquid crystal layer 8, liquid crystal molecules are vertical-aligned with respect to the substrate when a voltage is applied thereto, and are horizontal-aligned with respect to the substrate when no voltage is applied thereto. It is to be noted that the configuration of the liquid crystal layer 8 is not limited to that described above. For example, the liquid crystal layer 8 may be made from liquid crystal molecules that are horizontal-aligned with respect to the substrate when a voltage is applied thereto and are vertical-aligned with respect to the substrate when no voltage is applied thereto.

Figure 3:
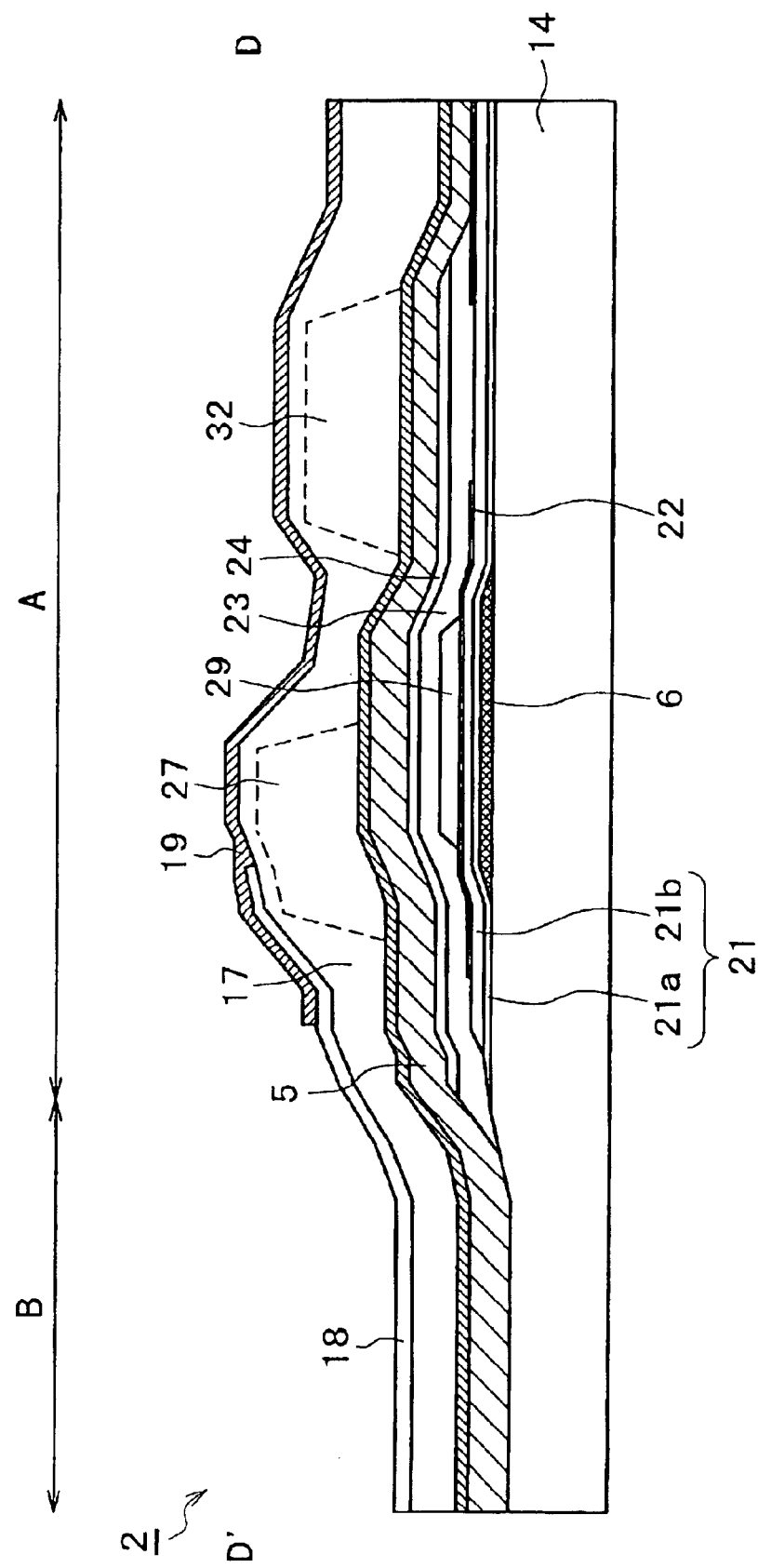
FIG. 3 is a sectional view taken on line D—D' of FIG. 1 showing an essential portion of the liquid crystal display device.

FIG. 3 is a sectional view taken on line D—D' of FIG. 1, which line extends in parallel to the data line 5 while passing through an approximately central portion of the date line 5.

A cross-sectional structure of the liquid crystal display device of the present invention, taken on line D—D' of FIG. 1, will be described with reference to FIG. 3.

As shown in FIG. 3, in a section, adjacent to the reflection display region A, of the data line region, there are stacked the Cs line 6, the gate insulating film 21, the semiconductor thin film 22, the stopper 29, the first interlayer insulating film 23, and the second interlayer insulating film 24 in this order on the transparent insulating substrate 14. It is to be noted that the gate insulating film 21 is composed of the multi-layer film having the silicon nitride film 21a and the silicon oxide film 21b and is formed so as to cover the Cs line. The data line 5 is formed on these interlayer insulating films 23 and 24. The planarizing layer 17 and the reflection electrode 19 are stacked in this order on the data line 5. The connection electrode 27 for connecting the drain electrode 26 to the pixel electrode 3 is formed on the data line 5 at a position corresponding to that of the Cs line 6. A connection electrode 32 for connecting the data line 5 to the source electrode 25 is also formed on the data line 5.

On the other hand, in a section, adjacent to the transmission display region B, of the data line region, the gate insulating film 21, the first interlayer insulating film 23, and the second interlayer insulating film 24 are removed, and the data line 5 is directly formed on the transparent insulating substrate 14. The planarizing layer 17 and the transparent electrode 18 extending from the section, adjacent to the reflection display region A, of the data line region are stacked in this order on the data line 5 in the section, adjacent to the transmission display region B, of the data line region.

In this way, the section, adjacent to the transmission display region B, of the data line 5 is formed on the plane different from the plane on which the section, adjacent to the reflection display region A, of the data line 5. Accordingly, the height of the section, adjacent to the transmission display region B, of the data line 5 is lower than the plane, adjacent to the reflection display region A, of the data line by a thickness equivalent to the total of the thicknesses of the gate insulating film 21, the first interlayer insulating film 23, and the second interlayer insulating film 24. As a result, even in the structure that the transmission display region B is made extremely close to the data line 5 for broadening the transmission display region B, it is possible to lower a difference-in-height between the transmission display region B and the data line region adjacent thereto as compared with the related art reflection-transmission hybrid type liquid crystal display device. This makes it possible to suppress enlargement of the ineffective region not satisfying the gap (thickness of the liquid crystal layer) necessary for transmission display in the section, adjacent to the data line 5, of the transmission display region B. The liquid crystal display device 1 of the present invention is thus advantageous in minimizing enlargement of the ineffective region while broadening the transmission display region B, thereby enhancing brightness of display light in the transmission display mode as compared with the related art reflection-transmission hybrid type liquid crystal display device.

The present invention, which has the feature of enhancing brightness of display light in the transmission display mode as described above, may be particularly applied to a reflection-transmission hybrid type liquid crystal display device of a type putting emphasis on transmission display, more specifically, of a type specified such that the reflectance of a display panel for light is in a range of 1% or more and 10% or less, and the transmittance of the display panel for light is in a range of 5% or more and 10% or less. In this case, it is possible to obtain the largest effect of the present invention. The reflection-transmission hybrid type liquid crystal display device in which the reflectance for light and the transmittance for light are specified as described above is capable of keeping the brightness of display light in the reflection display mode at a necessary minimal level and keeping the brightness of display light in the transmission display mode at the same level as that in the transmission type liquid crystal display device, thereby improving the visibility and color repeatability.

The section, adjacent to the transmission display region B, of the data line 5 is preferably formed on the transparent insulating substrate 14, that is, on the same plane of the transparent electrode 18 in the transmission display region B. With this structure, the difference-in-height between the transmission display region B and the data line region adjacent thereto can be minimized and the production process can be facilitated.

In the example shown in FIG. 3, the plane on which the section, adjacent to the transmission display region B, of the data line 5 is formed is made different from the plane on which the section, adjacent to the reflection display region A, of the data line 5 is formed by removing the gate insulating film 21, the first interlayer insulating film 23, and the second interlayer insulating film 24 from the transparent insulating substrate 14 in the section, adjacent to the transmission display region B, of the data line 5. The present invention, however, is not limited thereto. For example, the plane on which the section, adjacent to the transmission display region B, of the data line 5 is formed may be made different from the plane on which the section, adjacent to the reflection display region A, of the data line 5 is formed by removing at least one of the gate insulating film 21, the first interlayer insulating film 23, and the second interlayer insulating film 24 in the section, adjacent to the transmission display region B, of the data line 5. Alternatively, the plane on which the section, adjacent to the transmission display region B, of the data line 5 is formed may be made different from the plane on which the section, adjacent to the reflection display region A, of the data line 5 is formed by changing the thickness of at least one of the gate insulating film 21, the first interlayer insulating film 23, and the second interlayer insulating film 24 in the section, adjacent to the transmission display region B, of the data line 5 from the thickness of the at least one of the gate insulating film 21, the first interlayer insulating film 23, and the second interlayer insulating film 24 in the section, adjacent to the reflection display region A.

By the way, the section, adjacent to the transmission display region B, of the data line 5 is required to be covered with an insulating layer in order to prevent electrical contact with the transparent electrode 18. The insulating layer covering the section, adjacent to the transmission display region B, of the data line 5 may be formed into a gentle shape, more specifically, into a normal taper shape. This is effective to suppress occurrence of liquid crystal domains, reverse tilt, and the like, and hence to prevent an inconvenience such as leakage of light. From this viewpoint, the insulating layer covering the data line 5 is preferably tilt at a rising angle of 80° or less, more preferably, 45° or less.

The material used for forming the insulating layer covering the section, adjacent to the transmission display region B, of the data line 5 is not particularly limited but may be an organic or inorganic material exhibiting fluidity due to heat or light such as an acrylic based material, a polyolefin based material, or a styrene based material. The insulating layer having the above-described gentle shape, that is, normal taper shape can be obtained by forming the insulating layer from the above-described material, and then making the material reflow. Alternatively, even in the case of using a material not exhibiting fluidity due to heat or light, the insulating layer having the gentle shape, that is, normal taper shape can be obtained by etching using a wet process or back etching using a dry process. Further, by using a photosensitive organic material for forming the insulating layer covering the data line 5, the insulating layer can be highly accurately patterned at a desired position by photolithography.

The insulating layer covering the data line 5 may be formed by extending at least part of an irregularity forming layer portion formed in the reflection display region A. For example, in the case where the irregularity forming layer portion is made from a photosensitive organic material, the thickness of the irregularity forming layer portion covering the section, adjacent to the transmission display region B, of the data line 5 can be changed from the thickness of the irregularity forming layer portion covering the section, adjacent to the reflection display region A, of the data line 5 by adjusting the amount of exposure at the time of photolithography. With this method, since the thickness of the insulating layer on the data line 5 can be freely set, it is possible to obtain a necessary, sufficient capacitance between the electrodes and to realize the desired gentle shape.

Figure 4:
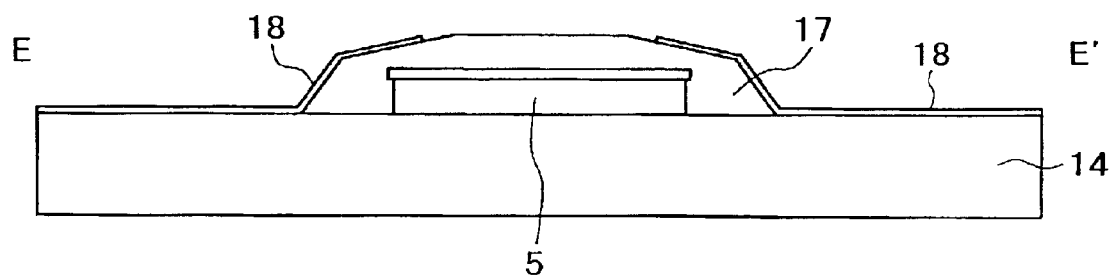
FIG. 4 is a sectional view taken on line E—E' of FIG. 1 showing an essential portion of the liquid crystal display device.
Figure 5:
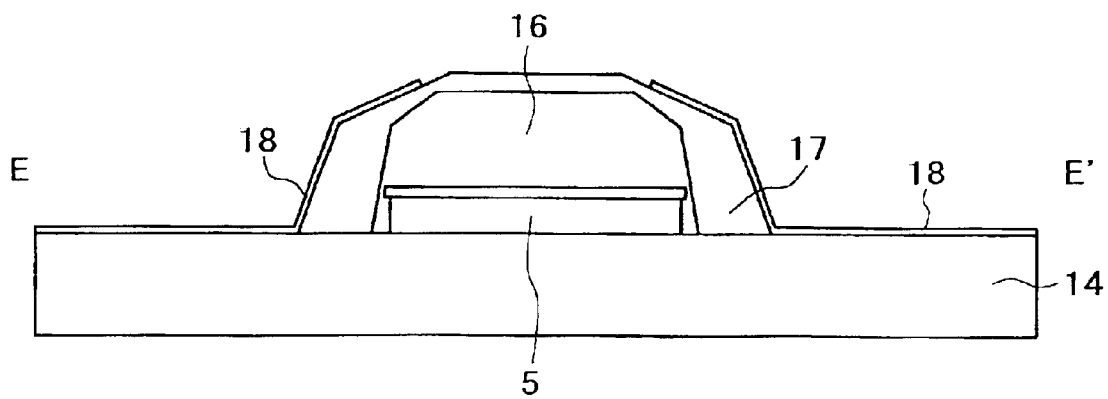
FIG. 5 is a sectional view taken on line E—E' of FIG. 1 showing another essential portion of the liquid crystal display device.
Figure 6:
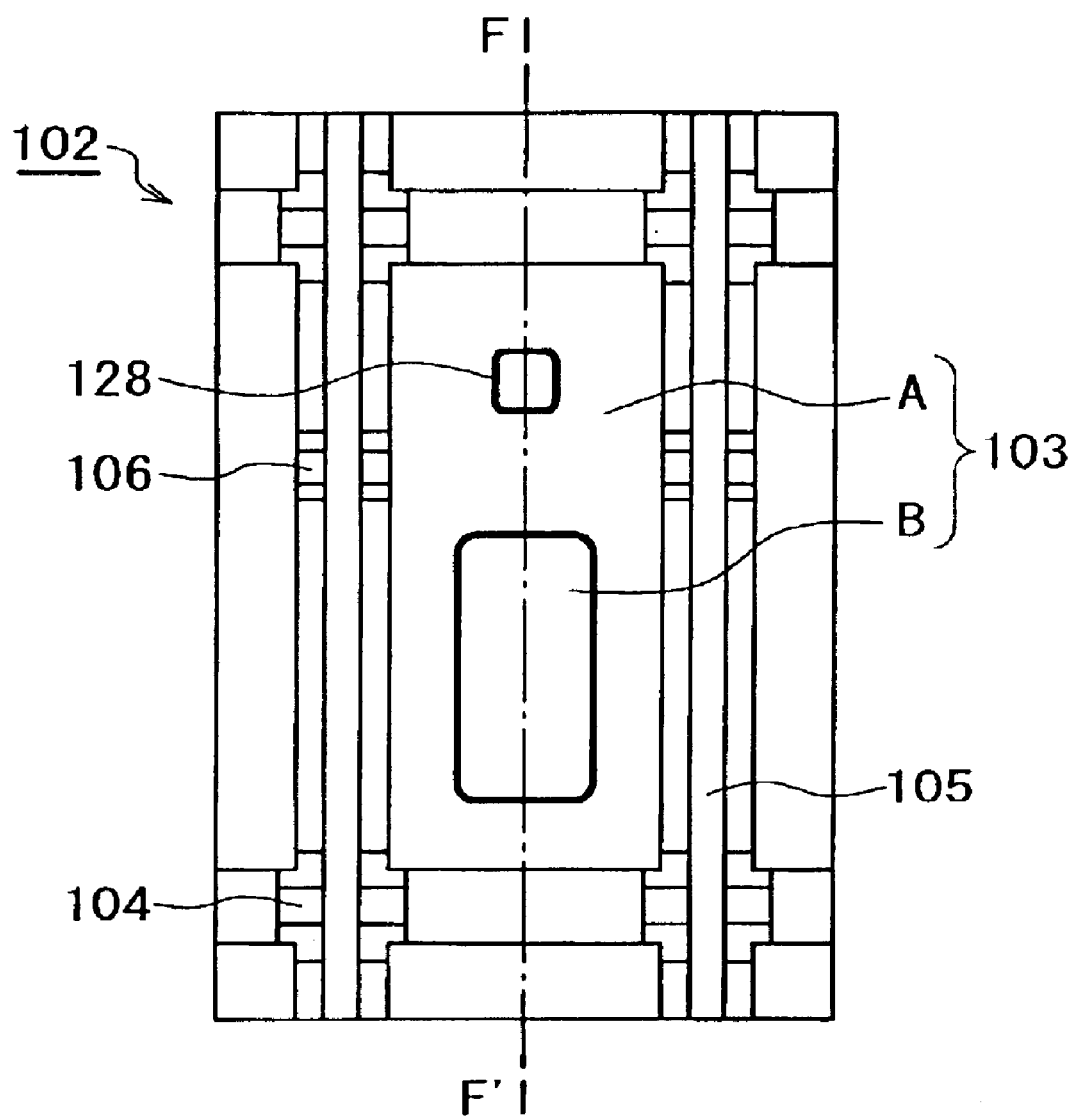
FIG. 6 is a plan view showing a TFT substrate of a related art reflection-transmission hybrid type liquid crystal display device.
Figure 7:
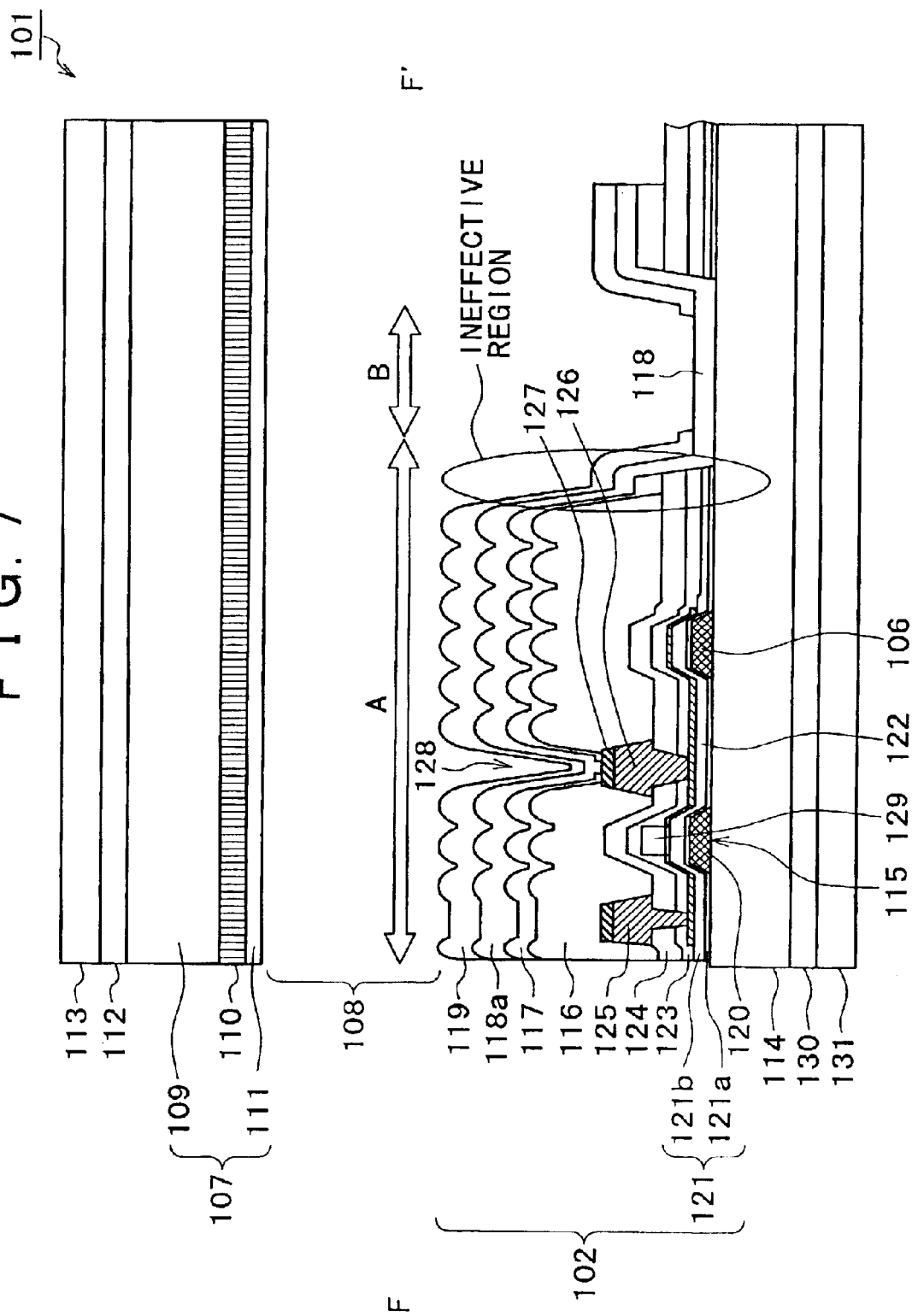
FIG. 7 is a sectional view taken on line F—F' of FIG. 6 showing an essential portion of the related art liquid crystal display device.
Figure 8:
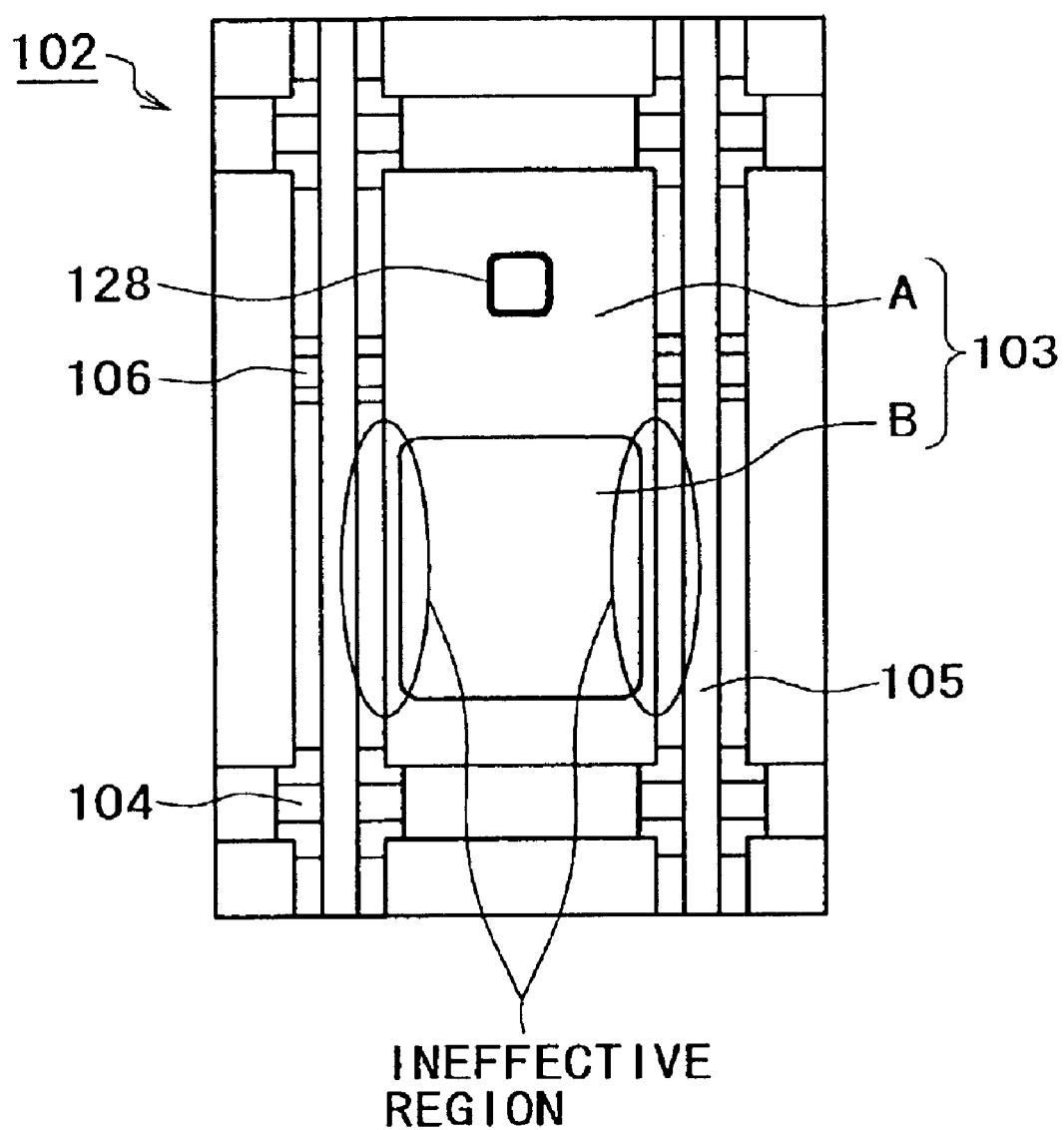
FIG. 8 is a plan view of the TFT substrate of the related art reflection-transmission hybrid type liquid crystal display device, with a transmission display region B enlarged.

The insulating layer covering the section, adjacent to the transmission display region B, of the data line 5 may be composed of only the planarizing layer 17 if the irregularity forming layer portion is composed of only the planarizing layer as shown in FIG. 4, the scattering layer 16 and the planarizing layer 17 if the irregularity forming layer portion is composed of the scattering layer 16 and the planarizing layer 17, or only the scattering layer 16 if the irregularity forming layer portion is composed of only the scattering layer 16. Alternatively, if the irregularity forming layer portion is composed of the scattering layer 16, the planarizing layer 17, and an additional layer, the insulating layer covering the section, adjacent to the transmission display region, of the data line 5 may be composed of the scattering layer 16, the planarizing layer 17, and the additional layer.

A method of fabricating the liquid crystal display device 1 having the structure shown in FIGS. 1, 2 and 3 will be described below.

A gate electrode 20, a gate insulating film 21 composed of a silicon nitride film 21a and a silicon oxide film 21b, and a semiconductor thin film 22 are sequentially deposited and patterned on a transparent insulating substrate 14. An impurity is doped in regions, on both sides of the gate electrode 20, of the semiconductor thin film 22, to form $N^+$ diffusion regions. A stopper 29 is formed on the semiconductor thin film 22, and a first interlayer insulating film 23 and a second interlayer insulating film 24 are formed in such a manner as to cover the semiconductor thin film 22 and the stopper 29.

Contact holes are formed by opening both the first interlayer insulating film 23 and the second interlayer insulating film 24 at positions corresponding to those of the pair of $N^+$ diffusion regions of the semiconductor thin film 22, for example, by etching. It is preferable that a part of the first interlayer insulating film 23 and the second interlayer insulating film 24, which part will be present under a section, adjacent to the transmission display region B, of a data line 5 (to be formed later) be removed by etching at the same time of the formation of the contact holes.

A source electrode 25 and a drain electrode 26 are formed so as to be connected to the semiconductor thin film 22 via the contact holes opened in the previous step, and are patterned into specific shapes.

A scattering layer 16 having a function of causing scattering reflection is formed and is patterned into a specific shape. A planarizing layer 17 is formed on the scattering layer 16, and is patterned into a specific shape. At the time of patterning the planarizing layer 17, portions of the gate insulating film 21, the first interlayer insulating film 23, and the second interlayer insulating film 24 in the transmission display region B are removed, to expose the transparent insulating substrate 14.

A transparent electrode 18 made from ITO is formed by sputtering. A reflection electrode 19 is formed on the transparent electrode 18 in a region corresponding to the reflection display region A. A TFT substrate 2 including the transparent insulating substrate 14 provided with the TFTs 15 and the like is thus obtained.

A color filter 10 and a counter electrode 11 are formed on a transparent insulating substrate 9 in accordance with a known method, to obtain a color filter substrate 7.

An alignment film is formed on each of the principal plane, provided with the TFTs 15, of the TFT substrate 2 and the principal plane, provided with the color filter 10, of the color filter substrate 7. The TFT substrate 2 and the color filter substrate 7 are stuck to each other with the alignment films directed inwardly, and a gap between both the TFT substrate 2 and the color filter substrate 7 is filled with liquid crystal, to form a liquid crystal layer 8. A λ/4 layer 30 and a polarizing plate 31 are stuck on the outer side of the TFT substrate 2, and a λ/4 layer 12 and a polarizing plate 13 are stuck on the outer side of the color filter substrate 7. A reflection-transmission hybrid type liquid crystal display device 1 having the same structure as that shown in FIG. 2 is thus accomplished.

Although the liquid crystal display device including TFTs of the so-called bottom gate structure is used in the above-described embodiment, the present invention is not limited thereto but may be applied to a liquid crystal display device including TFTs of a top gate structure.

As described above, according to the present invention, there can be provided a reflection-transmission hybrid type liquid crystal device capable of ensuring a sufficient area of a transmission display region while suppressing enlargement of an ineffective region at a section, adjacent to a date line, of a transmission display region, even if the transmission display region is broadened, thereby realizing high brightness of display light in the transmission display mode.

While the embodiments of the present invention have been described using specific terms, such description is for illustrative purposes only, and it is to be understood that changes and variations may be made without departing from the spirit or scope of the following claims.

What is claimed is:

1. A liquid crystal display device including a pair of substrates and a liquid crystal layer held therebetween, comprising:

a transmission display region for performing image display by transmission light and a reflection display region for performing image display by reflection light;

wherein a data line for supplying a signal to a drive element adapted to drive said liquid crystal layer is provided; and a section, adjacent to said transmission display region, of said data line is formed on a plane different from a plane on which a section, adjacent to said reflection display region, of said data line is formed.

2. A liquid crystal display device according to claim 1, wherein said different planes are formed by a manner that at least one layer provided under one of said sections, adjacent to said transmission display region and said reflection display region, of said data line is not provided under the other of said sections, adjacent to said transmission display region and said reflection display region, of said data line.

3. A liquid crystal display device according to claim 1, wherein said different planes are formed by a manner that the thickness of at least one layer provided on one of said sections, adjacent to said transmission display region and said reflection display region, of said data line is made different from the thickness of said at least one layer provided on the other of sections, adjacent to said transmission display region and said reflection display region, of said data line.

4. A liquid crystal display device according to claim 1, wherein said section, adjacent to said transmission display region, of said data line is formed on the same plane as a plane of a transparent electrode provided in said transmission display region.

5. A liquid crystal display device according to claim 1, wherein said section, adjacent to said reflection display region, of said data line is formed on an interlayer insulating film, and said section, adjacent to said transmission display region, of said data line is formed on a substrate.

6. A liquid crystal display device according to claim 1, wherein said section, adjacent to said transmission display region, of said data line is covered with an insulating layer.

7. A liquid crystal display device according to claim 6, wherein an edge portion of said insulating layer is tilted at a rising angle of 80° or less.

8. A liquid crystal display device according to claim 6, wherein said insulating layer is made from a photosensitive organic material.

9. A liquid crystal display device according to claim 6, wherein said insulating layer exhibits fluidity due to heat or light.

10. A liquid crystal display device according to claim 6, wherein said insulating layer is at least part of an irregularity forming layer portion formed in said reflection display region.

11. A liquid crystal display device according to claim 10, wherein said insulating layer is formed by thinning said irregularity forming layer portion formed in said reflection display region.

12. A liquid crystal display device according to claim 10, wherein said irregularity forming layer portion formed in said reflection display region is composed of two or more layers, and said insulating layer is one of said two or more layers.

13. A liquid crystal display device according to claim 12, wherein said irregularity forming layer portion formed in said reflection display region is composed of a scattering layer having irregularities and a planarizing layer for planarizing the irregularities of said scattering layer, and said insulating layer is composed of said planarizing layer.

* * * * *